(12) United States Patent
Gaiser

(10) Patent No.: US 8,006,487 B2
(45) Date of Patent: Aug. 30, 2011

(54) EXHAUST SYSTEM FOR AN INTERNAL COMBUSTION ENGINE

(75) Inventor: Gerd Gaiser, Reutlingen (DE)

(73) Assignee: J. Eberspaecher GmbH & Co. KG, Esslingen (DE)

(*) Notice: Subject to any disclaimer, the term of this patent is extended or adjusted under 35 U.S.C. 154(b) by 813 days.

(21) Appl. No.: 12/002,912

(22) Filed: Dec. 19, 2007

(65) Prior Publication Data

US 2008/0163612 A1  Jul. 10, 2008

(30) Foreign Application Priority Data

Dec. 19, 2006  (DE) .................. 10 2006 060 471

(51) Int. Cl.
*F01N 3/10* (2006.01)
(52) U.S. Cl. .......... 60/303; 60/286; 60/289; 60/295; 60/299; 60/300
(58) Field of Classification Search .......... 60/274, 60/275, 286, 289, 295, 297, 300, 301, 303
See application file for complete search history.

(56) References Cited

U.S. PATENT DOCUMENTS

| | | | |
|---|---|---|---|
| 4,589,254 A | | 5/1986 | Kume et al. |
| 5,586,433 A | * | 12/1996 | Boegner et al. .......... 60/274 |
| 6,363,716 B1 | * | 4/2002 | Balko et al. .......... 60/286 |
| 7,040,084 B2 | * | 5/2006 | Ament .......... 60/274 |
| 7,181,906 B2 | * | 2/2007 | Dalla Betta et al. .......... 60/286 |
| 7,263,822 B2 | * | 9/2007 | Bender et al. .......... 60/274 |
| 7,357,900 B2 | * | 4/2008 | Bartley et al. .......... 422/168 |
| 7,559,195 B2 | * | 7/2009 | Riegger et al. .......... 60/286 |
| 7,673,447 B2 | * | 3/2010 | Gaiser .......... 60/289 |

FOREIGN PATENT DOCUMENTS

| | | |
|---|---|---|
| DE | 2343578 | 8/1973 |
| EP | 0306743 A3 | 3/1989 |
| EP | 0367280 A1 | 5/1990 |
| EP | 0631039 A1 | 12/1994 |
| GB | 2131321 | 11/1983 |
| JP | 59-134313 | 8/1984 |
| JP | 59-150919 | 8/1984 |
| JP | 60-022015 | 2/1985 |

OTHER PUBLICATIONS

European Search Report dated Mar. 14, 2008.

* cited by examiner

*Primary Examiner* — Binh Q. Tran
(74) *Attorney, Agent, or Firm* — Howard IP Law Group, PC

(57) ABSTRACT

The present invention relates to an exhaust system for an internal combustion engine, in particular in a motor vehicle, comprising an exhaust line in which an exhaust treatment device, in particular an oxidation catalyst or a particulate filter is arranged for treating the exhaust gases coming from the internal combustion engine. It is essential to this invention that a device for heating the exhaust gases in the exhaust line is arranged upstream from the exhaust treatment device and is connected to a fuel supply and an air supply, the latter producing primary air and secondary air, and the device has a pre-oxidation zone a downstream post-oxidation zone, such that the pre-oxidation zone is connected to the fuel supply for its supply of liquid fuel and is connected to the air supply for its supply of primary air, while the post-oxidation zone is connected to the air supply for its supply of secondary air.

16 Claims, 4 Drawing Sheets

EXHAUST SYSTEM FOR AN INTERNAL COMBUSTION ENGINE

FIELD OF THE INVENTION

The present invention relates to an exhaust system for an internal combustion engine, in particular in a motor vehicle. The invention also relates to a method for heating exhaust gases in an exhaust system.

BACKGROUND OF THE INVENTION

An exhaust system usually comprises an exhaust line in which at least one exhaust treatment device, in particular an oxidation catalyst or a particulate filter is provided for treatment of the exhaust gases coming from the internal combustion engine.

After a lengthy shutdown, a certain amount of time is required in startup of the internal combustion engine during the so-called cold-start phase until the components arranged in the exhaust line such as the exhaust treatment device reach their operating temperature. During the cold-start phase, i.e., during the period of time in which the exhaust treatment device has not yet reached its operating temperature, output emissions are elevated because the purifying effect of the exhaust treatment device cannot be manifested until reaching the operating temperature. In particular, an exhaust treatment device designed as an oxidation catalyst will have only a greatly reduced oxidizing effect for unburned or incompletely burned hydrocarbons or none at all below its operating temperature. To be able to minimize emissions as much as possible even during the cold-start phase and thus be able to do justice to increasingly severe environmental protection requirements, it is desirable to be able to make the cold-start phase of an internal combustion engine as short as possible.

DE 10 2004 048 335 A1 describes an exhaust system for an internal combustion engine, in particular in a motor vehicle, having an exhaust line and an oxidation catalyst situated therein. Upstream from the oxidation catalyst there is a pre-oxidation unit in the exhaust line, said unit being designed and connected to a secondary fuel supply, so that it preferably completely oxidizes the secondary fuel supplied to it in conjunction with an oxidizer during a catalytic converter heating mode. In this way, the cold-start phase of the internal combustion engine should be shortened in particular.

SUMMARY OF THE INVENTION

The present invention relates to the problem of providing an improved embodiment or at least a different embodiment for an exhaust system of the generic type that is characterized by a shorter cold-start phase in particular.

The invention is based on the general idea of providing a device for heating the exhaust gases upstream from the exhaust gas aftertreatment device in the exhaust line, said device for heating the exhaust gases being connected to a fuel supply and to an air supply that produces both primary and secondary air. This device has a pre-oxidation zone and a downstream post-oxidation zone, such that the pre-oxidation zone is connected to the fuel supply for the supply of liquid fuel and is connected to the air supply for the supply of primary air and therefore it can induce oxidation of the fuel-primary air mixture. However, the post-oxidation zone is connected to the air supply for the supply of secondary air and also contributes toward preferably completely oxidizing any unoxidized constituents of the mixture of primary air and fuel from the pre-oxidation zone in the post-oxidation zone. At least partial oxidation of the added fuel with the added primary air is accomplished in the pre-oxidation zone, whereas in the post-oxidation zone further oxidation of the mixture can be accomplished with the help of the added secondary air. Oxidation of the fuel-air mixture produces an effective heating of the exhaust gases and thus significantly shortens the cold-start phase. The exhaust treatment device therefore reaches its required operating temperature more rapidly, so that increased emissions during the cold-start phase can be reduced.

It is expedient to provide a porous flow-through structure between the pre-oxidation zone and the post-oxidation zone, this porous structure being designed so that it prevents droplets of fuel from breaking through into the post-oxidation zone and homogenizes the mixture of fuel, primary air and oxidation products. Due to the design described here with pre-oxidation zone, a flow-through porous structure and a post-oxidation zone, it is possible to achieve the result that the main oxidation takes place preferably downstream from the porous structure. Therefore, the main heat of oxidation is also produced and/or released downstream from the porous structure, so that the porous structure on the whole has a lower temperature during operation of the device, which has a positive effect on the service life. Due to the smaller amount of primary air, less heat is also dissipated from the porous structure, which has a positive effect on a low emissions starting performance, especially in a cold-start. Likewise, due to the smaller quantity of primary air, less heat is also dissipated at a sheathed-element glow plug of an ignition system in the pre-oxidation zone, so the glow plug has a better and more rapid ignition performance.

In an advantageous further embodiment of the inventive approach, a secondary air channel which surrounds the pre-oxidation zone and the porous structure in the form of a ring is provided in the area of a housing wall of the device. This gap between the outside wall and the inside wall of the device results in a lower outside wall temperature on the whole during operation of the device, which has an advantageous effect with regard to a temperature burden on the components surrounding the device. In addition, an effective reduction in the temperature of the outside wall of the device can be achieved due to the secondary air channel, so its thermal burden can be lowered.

In another advantageous embodiment of the inventive approach, the porous structure has at least one of the following materials and/or at least one of the following forms: metallic or ceramic nonwoven, metallic or ceramic foam, honeycomb monolith, metallic or ceramic fiber knit, expanded metal, metallic structure with a ceramic coating, metallic or ceramic structure with a catalytic coating. The porosity of the flow-through structure is preferably selected so that the pressure drop in flow through the structure is not too great on the one hand while on the other hand the pressure drop is sufficient to achieve a good homogenization and/or thorough mixing of the mixture of primary air, fuel and oxidation products in flow through the porous structure. The pore size and porosity of the porous structure are selected so that a droplet breakthrough of unevaporated fuel droplets can be effectively suppressed. Examples of a suitable active catalytic coating include, for example, applied components such as platinum, palladium, rhodium, ruthenium or other noble metals. The pre-oxidation reactions can be influenced or selected in a targeted manner through the targeted choice of the active components of the catalytic coating. This permits especially active control of the oxidation reaction.

It is self-evident that the features mentioned above and those yet to be explained below may be used not only in the particular combination given but also in other combinations or alone without going beyond the scope of the present invention.

Preferred exemplary embodiments of the invention are illustrated in the following drawings and explained in greater detail in the following description, where the same reference numerals are used to refer to the same or functionally same or similar components.

DETAILED DESCRIPTION OF THE INVENTION

Figure 1:
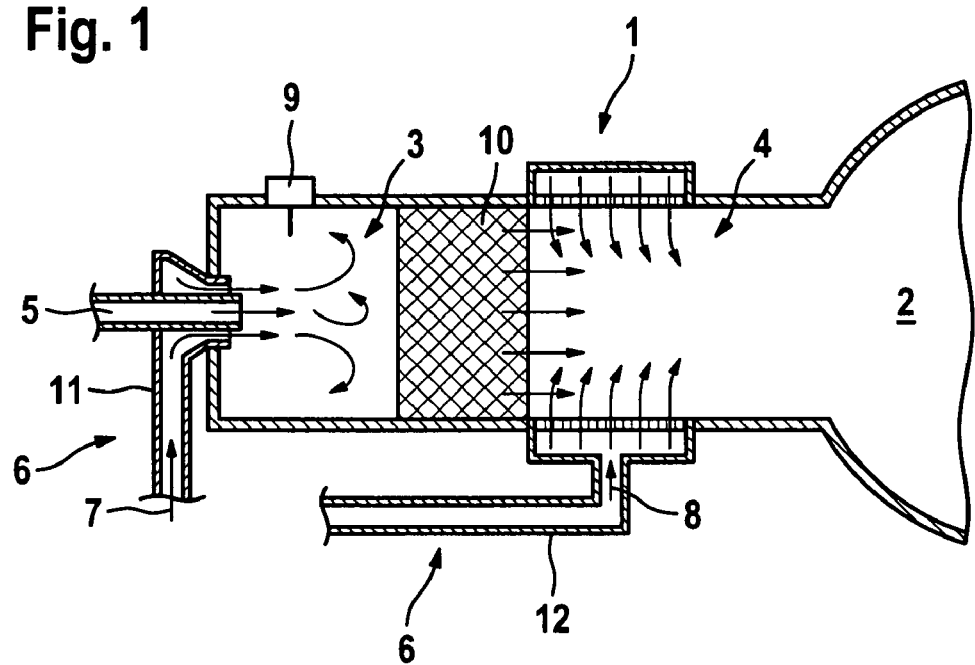
FIG. 1 shows a sectional diagram through an inventive device for heating exhaust gases in an exhaust line of an internal combustion engine.

According to FIG. 1, a device 1 for heating exhaust gases flowing in an exhaust line 2 is equipped with a pre-oxidation zone 3 and a post-oxidation zone 4. The exhaust line 2 is part of an exhaust system (not shown otherwise) carrying exhaust gases produced during operation of an internal combustion engine (also not shown) away from the internal combustion engine. The internal combustion engine here is preferably installed in a motor vehicle. For treatment and/or cleaning of exhaust gases produced in the internal combustion engine, the exhaust system has an exhaust treatment device (also not shown here), e.g., an oxidation catalyst or a particulate filter, installed in the exhaust line 2 downstream from the inventive device 1.

Such exhaust treatment devices require a minimum temperature to be able to manifest their full effect, but this minimum temperature is not reached during a cold-start phase of the internal combustion engine in particular. Below the operating temperature, however, the exhaust treatment device cannot function adequately or at all, so that increased emissions of pollutants must be expected in this temperature range. The inventive device 1 is provided to make it possible to more rapidly reach the operating temperature of the exhaust treatment device in the cold-start phase. The device 1 is installed upstream from the exhaust treatment device and is connected to a fuel supply 5 and an air supply 6, which produces both a primary and secondary air. In the following discussion, the primary air is labeled with reference numeral 7 and the secondary air is labeled with reference numeral 8. The primary air 7 together with the fuel coming from the fuel supply 5 flows into the pre-oxidation zone 3, where it is homogenized and ignited by an ignition device 9, e.g., a sheathed-element glow plug. To supply the pre-oxidation zone 3 with primary air 7 and fuel, it is connected to the corresponding fuel supply 5 and to the corresponding air supply 6. The post-oxidation zone 4, however, is connected to the air supply 6 to supply it with secondary air 8.

Between the pre-oxidation zone 3 and the post-oxidation zone 4, a porous flow-through structure 10 is provided, constituting a flow obstacle between the pre-oxidation zone 3 and the post-oxidation zone 4 and serving to prevent a droplet breakthrough of liquid fuel from the pre-oxidation zone 3 into the post-oxidation zone 4 on the one hand while also serving to homogenize the mixture of fuel, primary air 7 and oxidation products present in the pre-oxidation zone 3 on route to the downstream post-oxidation zone 4.

In the post-oxidation zone 4, another oxidizer is added to the mixture of fuel, primary air 7 and oxidation products along with the secondary air 8, so that after leaving the post-oxidation zone 4 and on entering the exhaust line 2, complete oxidation will have preferably taken place. As shown in FIG. 1, primary air 7 is supplied into the pre-oxidation zone 3 via a first supply line 11 while secondary air 8 is supplied into the post-oxidation zone 4 via a second separate supply line 12. These lines can be connected to a shared air supply 6 as mentioned in the introduction.

The porous structure 10 may have at least one of the following materials and/or at least one of the following forms: metallic or ceramic nonwoven, metallic or ceramic foam, honeycomb monolith, metallic or ceramic fiber knit, expanded metal, metallic structure with a ceramic coating, metallic or ceramic structure with a catalytic coating. On the other hand, a primer coat, e.g., a so-called wash coat containing at least one of the following components may also be applied to the porous structure: aluminum oxide, titanium oxide, cerium oxide. As an alternative to this it is also possible for a primer coat containing at least one of the components listed above to be provided between the porous structure 10 and the catalytic coating. The oxygen-storing effect of the cerium oxide in particular is especially useful at this point because due to the pulsed fuel metering, the oxygen conditions prevailing locally undergo periodic fluctuations and in particular may fluctuate between oxidizing and reducing (i.e., lean and rich) conditions of the fuel mixture. The oxygen-storing effect of the cerium oxide can have an equalizing effect here and may thus create almost constant conditions over time.

The porous structure 10 is preferably designed as an open-pored structure, with the porosity being selected so that on the one hand the pressure drop in flow through the porous structure is not too great but on the other hand the pressure drop is great enough to achieve a good homogenization effect, i.e., a thorough mixing in flow through the structure. Furthermore, the pore size and porosity are selected in such a way as to effectively prevent droplet breakthrough of unevaporated fuel droplets.

The catalytic coating described above may contain, for example, active components such as platinum, palladium, rhodium, ruthenium or other noble metals and may therefore permit a targeted influence on certain pre-oxidation reactions. Instead of the coating containing a noble metal, a coating of mixed oxides may also be used. In general, it is also conceivable for the effect of an oxygen-storing component such as cerium oxide to be so great that it seems expedient to use the wash coat even when no impregnation with noble metals or mixed oxides is provided.

Figure 3:
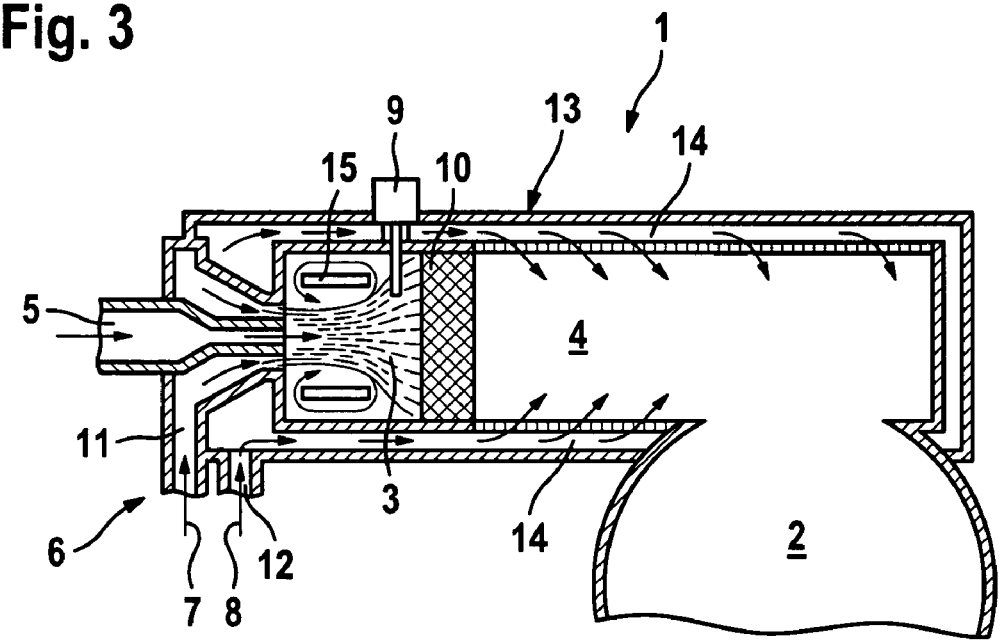
Figure 4:
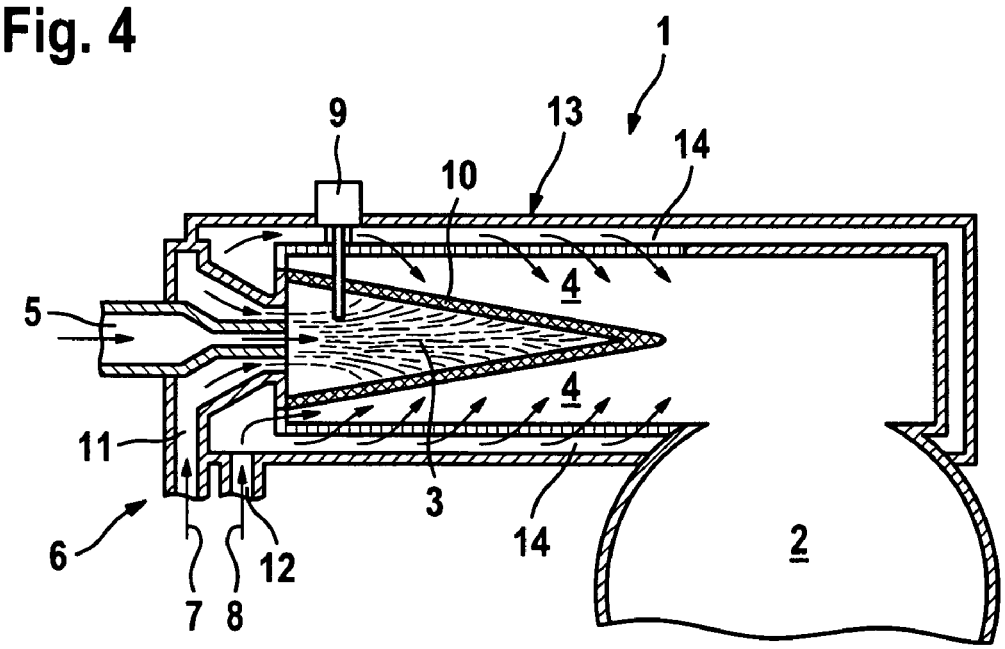

In general, the porous structure 10 may be designed as a disk (see FIGS. 1 through 3) or as a sleeve (not shown) or a cone (see FIG. 4).

Figure 2:
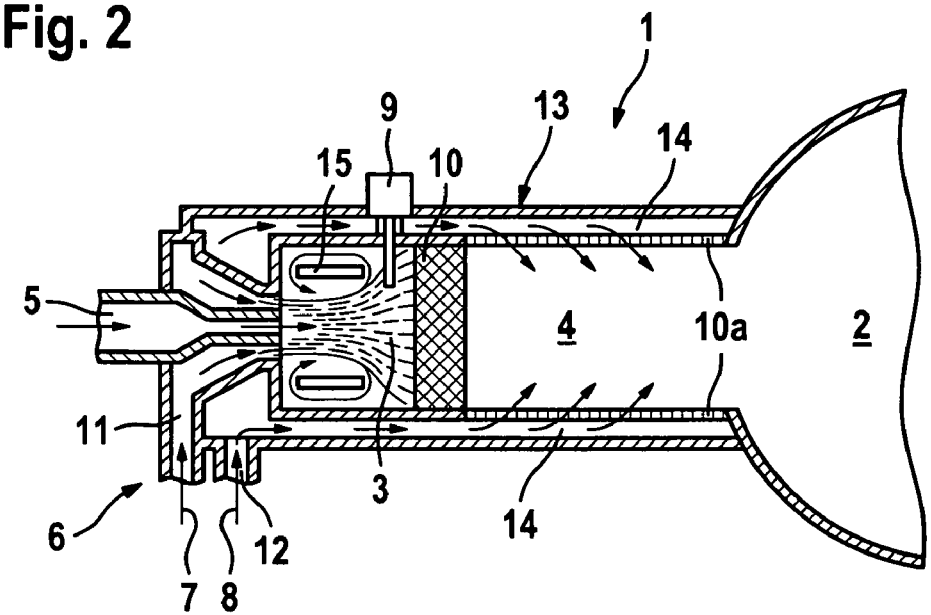
FIGS. 2-6 show a device like that in FIG. 1, but in different embodiments.

In contrast with FIG. 1, with the devices 1 according to FIGS. 2 through 4, a secondary air channel 14 which is provided in the area of a housing wall 13 of the device 1, surrounding the pre-oxidation zone 3 and the porous structure 10 in a ring. This offers the advantage that the secondary air 8 flowing in the secondary air channel 14 cools the pre-oxidation zone 3 and the porous structure 10, resulting in low operating temperatures and therefore a longer lifetime. At the same time the temperature burden for components surrounding the device 1 is reduced because an external temperature of the device 1 is definitely much cooler. The secondary air channel 14 here is designed according to FIGS. 2 through 4 in the manner of a ring channel. Both the primary air 7 and the secondary air 8 are supplied in the area of a fuel feed, so a compact connecting area to the fuel supply 5 as well as to the air supply 6 can be created. The primary air feed is preferably formed in a ring around the fuel feed so that a thorough mixing is achieved on admission of the fuel and the primary air 7 into the pre-oxidation zone 3. A further improvement with regard to the thorough mixing can be achieved, for example, by means of baffle elements 15 or via flow openings that create turbulence such as eddies and/or swirls. These may be arranged with regard to their number, size and distribution in such a way as to yield a preferably optimal mixing effect in the respective oxidation zone 3, 4. Such a mixing air and/or homogenization aid may also be provided in the form of porous flow-through structures 10*a* which are situated between the secondary air channel 14 and the post-oxidation zone 4, for example, and cause a planar distribution of the injected secondary air 8. Such a porous flow-through structure 10*a* may of course also be situated in the area of the primary air feed in the pre-oxidation zone 3. The air distribution may be adjusted in a targeted manner through the porosity of the porous structure 10*a*, but a more planar distribution of the air can be achieved through a lower porosity, and an outgoing flow tends to be achieved at the beginning of the porous structure 10*a* with a coarser porosity. The superficially distributed air feed may of course also be combined with and/or connected to a local distribution of flow openings. A different depth effect of the incoming primary air 7 and/or secondary air 8 can be achieved through the design of the flow openings in particular, so that the air distribution and/or homogenization can be controlled in a targeted manner through the inflow depth. For example, a nonwoven and/or a metallic foam and/or a thin plate with holes, in particular etched holes, may be provided as the porous structure 10*a* here.

According to FIG. 4, the porous structure 10 is designed as a hollow cone, with a cone interior comprising the pre-oxidation zone 3 and a cone exterior comprising the post-oxidation zone 4. The ignition device 9, which is arranged in the housing wall 13 of the device 1, passes first through the housing wall 13 and the post-oxidation zone 4 as well as the porous structure 10 to be immersed at its ignitable end area in the pre-oxidation zone 3. The exhaust line 2 may be arranged, for example, at the longitudinal end of the device 1, as shown in FIGS. 1 and 2, or at the side of the device 1 (see FIGS. 3 and 4) and connected so it communicates with the post-oxidation zone 4. The embodiments shown in FIGS. 1 through 4 do not of course make any claim at thoroughness, so that a different arrangement and/or alignment of the device 1 with respect to the exhaust line 2 or a different embodiment and/or arrangement of coarse structure 10 would also be covered by the present invention as long as the porous structure 10 separates a pre-oxidation zone 3 from a post-oxidation zone 4 in the device 1.

According to this invention the device 1 functions as follows:

First a mixture of primary air 7 and fuel is introduced through corresponding flow openings into the pre-oxidation zone 3 so as to yield a homogeneous mixture of fuel and primary air 7. This fuel-primary air mixture is highly flammable and therefore can easily be ignited by the ignition device 9, so the mixture is at least partially oxidized. The porous structure 10, which is situated between the pre-oxidation zone 3 and the post-oxidation zone 4, is located downstream from the pre-oxidation zone 3, homogenizing and/or thoroughly mixing the at least partially oxidized mixture of fuel, primary air 7 and oxidation products and also reliably preventing droplet breakthrough of unoxidized fuel into the post-oxidation zone 4. In addition, oxidizer, e.g., air is supplied through the second supply line 12 in the post-oxidation zone 4, so that preferably complete combustion and/or oxidation of as yet unoxidized, i.e., unburned constituents can be achieved. The hot oxidation stream leaving the post-oxidation zone 4 strikes the exhaust gases coming from the internal combustion engine in the exhaust line 2 and heats them. Due to the exhaust gases heated in this way, the exhaust treatment device arranged downstream from the device 1 in the exhaust line 2 reaches its operating temperature more rapidly, so that the cold-start phase which has increased emissions can be shortened. In this way, the oxidation processes taking place in the pre-oxidation zone 3 and the post-oxidation zone 4 can be controlled effectively through the corresponding metered addition of primary air 7 and secondary air 8.

Figure 5:
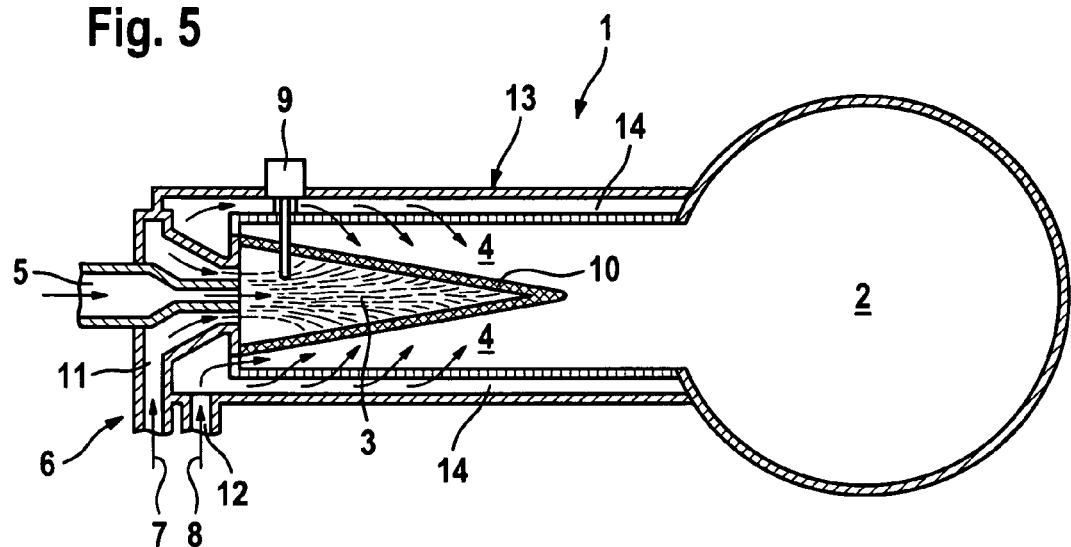

FIG. 5 shows essentially a combination of the device 1 according to FIG. 4 and the arrangement of the exhaust line 2 according to FIG. 2. The porous structure 10 and/or the device 1 are arranged here at the side of the exhaust line 2.

Figure 6:
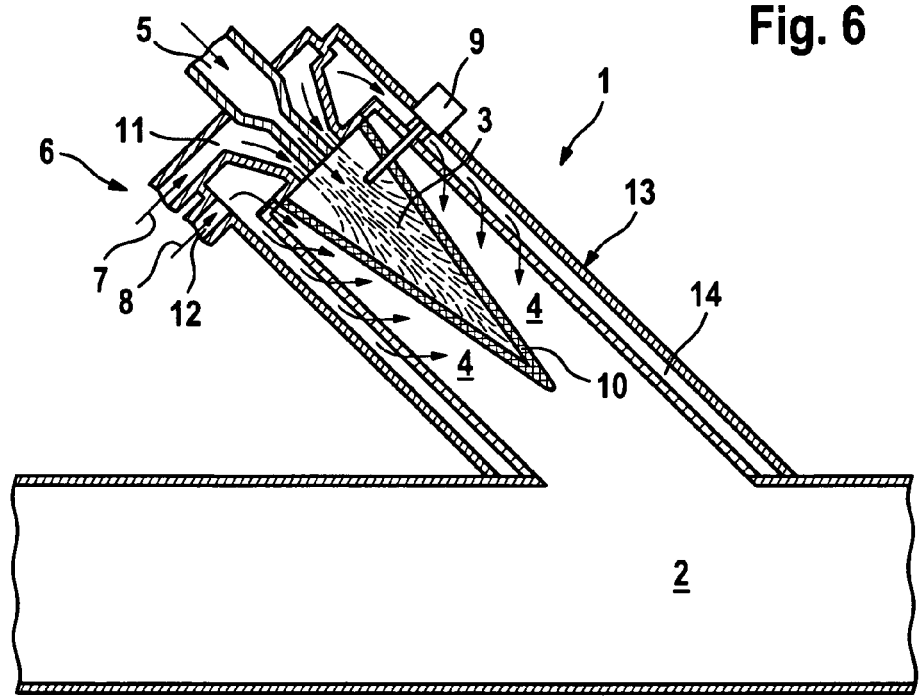

In FIG. 6 the device 1 is arranged so that it is inclined by an angle of approx. 20° to 60°, preferably approx. 30° to 50°, in relation to the exhaust line 2. The device 1 according to FIG. 6 corresponds to the device shown in FIG. 4, which may thus be referenced with regard to the description.

Figure 7:
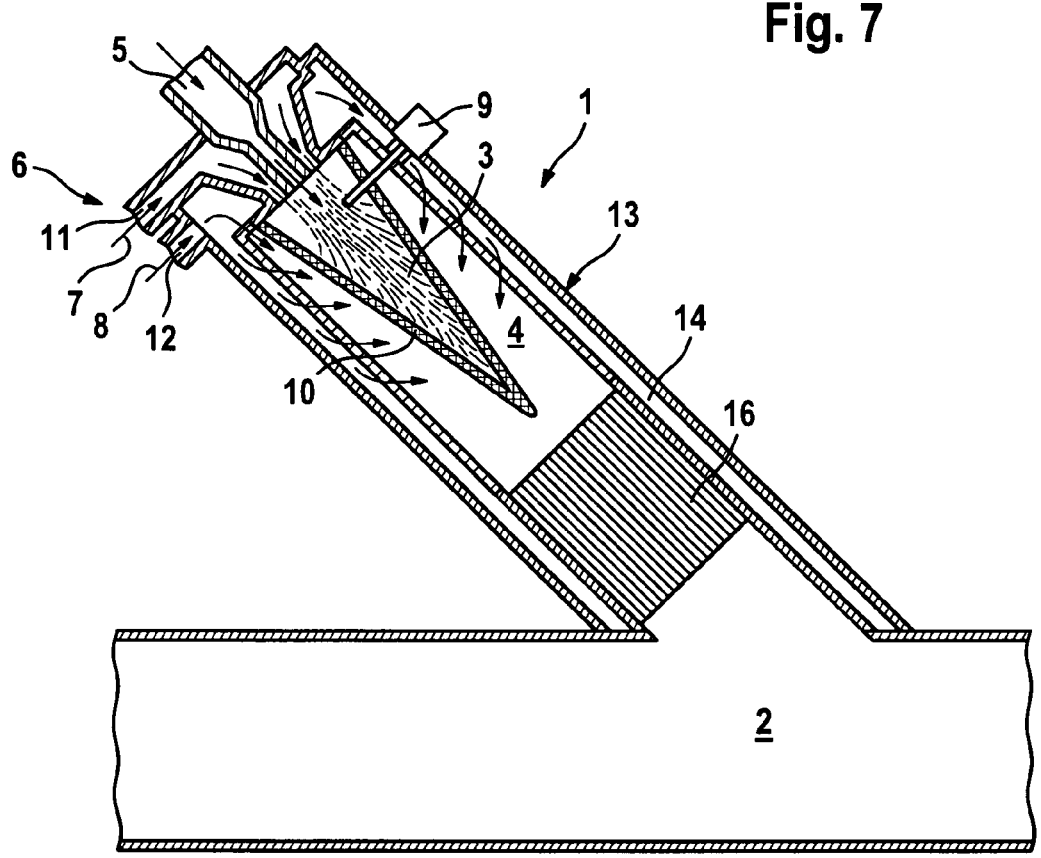
FIG. 7 shows a device like that in FIG. 6, but with an additional catalytic converter.

FIG. 7, in contrast with FIG. 6, additionally shows a catalytic converter 16 situated between the device 1 and the exhaust line 2. The catalytic converter 16 may be used in addition to or instead of the catalytic coating on the porous structure 10 and may be embodied as a ceramic honeycomb monolith and/or as a metallic support. An active coating on the catalytic converter 16 may be designed either as an oxidation catalyst or as a partial oxidation catalyst. In the former case, oxidation may occur at low temperatures, but reformate, i.e., fractions of hydrogen and carbon monoxide, may be produced in an especially advantageous manner in the second case. This reformate may in turn be used advantageously for regeneration of a $NO_x$ storage catalyst.

In addition, the device 1 is also not limited to an application with an internal combustion engine in a motor vehicle but instead may also be used in other areas of application, e.g., in burners or reformers.

The invention claimed is:

1. An exhaust system for an internal combustion engine in a motor vehicle, comprising
    an exhaust line in which an exhaust treatment device is provided for treatment of the exhaust gases coming from the internal combustion engine,
    wherein upstream from the exhaust treatment device, a heating device is provided for heating the exhaust gases in the exhaust line, the heating device being connected to a fuel supply and to an air supply which produces primary air and secondary air, the heating device having a pre-oxidation zone and a post-oxidation zone situated downstream from the pre-oxidation zone, the pre-oxidation zone connected to the fuel supply to supply it with liquid fuel and connected to the air supply for its supply of primary air, the post-oxidation zone being connected to the air supply for its supply of secondary air, and
    wherein the heating device further comprises a porous flow-through structure arranged between the pre-oxidation zone and the post-oxidation zone for retarding droplet breakthrough of fuel into the post-oxidation zone and homogenizing a mixture of fuel, primary air and oxidation products.

2. The exhaust system according to claim 1, wherein the porous structure has at least one of the following materials and forms: metallic or ceramic nonwoven, metallic or ceramic foam, honeycomb monolith, metallic or ceramic fiber knit, expanded metal, metallic structure with a ceramic coating, metallic or ceramic structure with a catalytic coating.

3. The exhaust system according to claim 2, wherein a primer coat is applied to the porous structure, said primer coat comprising at least one of the following components: aluminum oxide, titanium oxide, and cerium oxide.

4. The exhaust system according to claim 1, wherein the porous structure is configured as one of a disk, a sleeve and a cone.

5. The exhaust system according to claim 1, wherein an ignition device is provided in the pre-oxidation zone of the device for igniting the mixture of fuel and primary air.

6. The exhaust system according to claim 1, wherein primary air is supplied to the pre-oxidation zone via a first supply line, while secondary air is supplied to the post-oxidation zone via a separate second supply line.

7. An exhaust system, for an internal combustion engine, comprising:
an exhaust line in which an exhaust treatment device is provided for treatment of the exhaust gases coming from the internal combustion engine,
wherein upstream from the exhaust treatment device, a heating device is provided for heating the exhaust gases in the exhaust line, the heating device being connected to a fuel supply and to an air supply which produces primary air and secondary air, the heating device having a pre-oxidation zone and a post-oxidation zone situated downstream from the pre-oxidation zone, the pre-oxidation zone connected to the fuel supply to supply it with liquid fuel and connected to the air supply for its supply of primary air,
the post-oxidation zone being connected to the air supply for its supply of secondary air,
wherein the heating device further comprises a porous flow-through structure arranged between the pre-oxidation zone and the post-oxidation zone for retarding droplet breakthrough of fuel into the post-oxidation zone and homogenizing a mixture of fuel, primary air and oxidation products, and
wherein a secondary air channel which surrounds the pre-oxidation zone and the porous structure in the form of a ring is provided in the area of a housing wall of the heating device.

8. The exhaust system according to claim 1, wherein at least one of the primary air and the secondary air enters the corresponding oxidation zone via flow openings that produce a turbulence.

9. The exhaust system according to claim 7, wherein a second porous flow-through structure is provided between the secondary air channel and the post-oxidation zone for achieving a planar distribution of the injected secondary air.

10. The exhaust system according to claim 9, wherein the second porous structure comprises at least one of a nonwoven foam, a metallic foam, and a thin plate containing holes.

11. An exhaust system for an internal combustion engine, comprising:
an exhaust line in which an exhaust treatment device is provided for treatment of the exhaust gases coming from the internal combustion engine,
wherein upstream from the exhaust treatment device, a heating device is provided for heating the exhaust gases in the exhaust line, the heating device being connected to a fuel supply and to an air supply which produces primary air and secondary air, the heating device having a pre-oxidation zone and a post-oxidation zone situated downstream from the pre-oxidation zone, the pre-oxidation zone connected to the fuel supply to supply it with liquid fuel and connected to the air supply for its supply of primary air,
wherein the post-oxidation zone being connected to the air supply for its supply of secondary air,
wherein at least one of the primary air and the secondary air enters the corresponding oxidation zone via flow openings that produce a turbulence,
wherein metered addition of the primary air and fuel is coordinated with the flow openings, so that a homogeneous mixture of fuel and primary air is obtained in the pre-oxidation zone, the fuel-primary air mixture ignitable by an ignition device, whereupon it is oxidized at least partially, and
wherein the heating device further comprises a porous flow-through structure configured to prevent droplet breakthrough of unoxidized fuel into the post-oxidation zone and to homogenize a mixture of fuel, primary air and oxidation products, wherein the secondary air feed is fed into the post-oxidation zone in such a way that at least one of complete combustion and post-oxidation takes place in the post-oxidation zone.

12. The exhaust system according to claim 1, wherein the exhaust treatment device is an oxidation catalyst.

13. The exhaust system according to claim 1, wherein the exhaust treatment device is a particulate filter.

14. The exhaust system according to claim 2, wherein a primer coat is applied between the porous structure and the catalytic coating, said primer coat comprising at least one of the following components; aluminum oxide, titanium oxide, cerium oxide.

15. An exhaust system for an internal combustion engine, comprising
an exhaust line in which an exhaust treatment device is provided for treatment of the exhaust gases coming from the internal combustion engine, and
a heating device, upstream from the exhaust treatment device, and configured for heating the exhaust gases in the exhaust line, the heating device being connected to a fuel supply and to an air supply which produces primary air and secondary air, the heating device having a pre-oxidation zone, a post-oxidation zone situated downstream from the pre-oxidation zone, and a cone-shaped porous flow-through structure arranged between the pre-oxidation zone and the post-oxidation zone, the pre-oxidation zone connected to the fuel supply to supply it with liquid fuel and connected to the air supply for its supply of primary air, the post-oxidation zone being connected to the air supply for its supply of secondary air, the cone-shaped, porous flow-through structure retarding droplet breakthrough of fuel into the post-oxidation zone and homogenizing a mixture of fuel, primary air and oxidation products.

16. The exhaust system of claim 15, wherein the interior of the cone-shaped, porous flow-through structure comprises the pre-oxidation zone and the exterior of the cone-shaped, porous flow-through structure in the heating device comprises the post-oxidation zone.

* * * * *